United States Patent
Neufeld et al.

(10) Patent No.: US 6,753,664 B2
(45) Date of Patent: Jun. 22, 2004

(54) METHOD FOR LINEARIZATION OF AN ACTUATOR VIA FORCE GRADIENT MODIFICATION

(75) Inventors: Richard David Neufeld, Burnaby (CA); Christopher Earl Trautman, North Vancouver (CA)

(73) Assignee: Creo Products Inc., Burnaby (CA)

( * ) Notice: Subject to any disclaimer, the term of this patent is extended or adjusted under 35 U.S.C. 154(b) by 162 days.

(21) Appl. No.: 09/813,839

(22) Filed: Mar. 22, 2001

(65) Prior Publication Data

US 2002/0135329 A1 Sep. 26, 2002

(51) Int. Cl.⁷ .............................................. H02N 1/00
(52) U.S. Cl. ..................... 318/116; 318/119; 310/309
(58) Field of Search ..................... 310/309; 318/116, 318/119, 460; 385/18; 345/85; 359/290, 291

(56) References Cited

U.S. PATENT DOCUMENTS

| | | | |
|---|---|---|---|
| 4,529,262 A | 7/1985 | Hamilton | 310/90.5 |
| 4,642,501 A | 2/1987 | Kral et al. | 310/90.5 |
| 4,814,907 A | 3/1989 | Goor | 360/75 |
| 4,835,461 A * | 5/1989 | Snelling | 324/109 |
| 4,882,512 A | 11/1989 | Andrus | 310/90.5 |
| 4,954,904 A | 9/1990 | Goor | 360/75 |
| 4,956,619 A | 9/1990 | Hornbeck | 330/4.3 |
| 5,003,211 A | 3/1991 | Groom | 310/90.5 |
| 5,227,948 A | 7/1993 | Boon et al. | 361/144 |
| 5,258,591 A | 11/1993 | Buck | 200/181 |
| 5,269,918 A | 12/1993 | Ho et al. | 369/112 |
| 5,528,939 A * | 6/1996 | Martin et al. | 73/702 |
| 5,729,075 A * | 3/1998 | Strain | 310/309 |
| 6,028,301 A | 2/2000 | Kim et al. | 250/214 LS |
| 6,040,611 A | 3/2000 | De Los Santos et al. | 257/415 |
| 6,446,486 B1 * | 9/2002 | DeBoer et al. | 73/9 |
| 6,480,646 B2 * | 11/2002 | Farmer et al. | 385/18 |
| 6,543,286 B2 * | 4/2003 | Garverick et al. | 73/514.18 |

* cited by examiner

Primary Examiner—Karl Tamai
(74) Attorney, Agent, or Firm—Oyen Wiggs Green & Mutala

(57) ABSTRACT

In accordance with the present invention, the control over a high-speed non-linear actuator is improved by linearizing the relationship between the actuating impetus and the feedback control signal via a method that employs the separate and concurrent control of the static and dynamic characteristics of the device without resorting to the use of force-feedback or field-strength feedback. The resonant frequency of the plunger of the actuator is manipulated during operation such as to maintain it at a substantially fixed optimal value. The method is particularly advantageous in devices where space is at a premium and force-feedback or field-strength feedback mechanisms are difficult to implement.

21 Claims, 1 Drawing Sheet

METHOD FOR LINEARIZATION OF AN ACTUATOR VIA FORCE GRADIENT MODIFICATION

FIELD OF THE INVENTION

The present invention pertains to the field of servo-mechanical actuators and, in particular, to the high precision and high speed positioning of objects using actuators.

BACKGROUND OF THE INVENTION

Electromechanical and servo-mechanical systems make extensive use of a very wide range of actuators. Magnetic actuators in particular find wide industrial use as these devices lend themselves to control via the use of appropriately controlled electric current through suitably designed electromagnets. Applications range widely. While much effort has gone into balancing systems for valves, levitation devices, and "frictionless" bearings, it is the high speed and high accuracy arena, such as the fields of data storage on various magnetic and optical media, that has provided an impetus for the development of the technology. In these applications magnetically actuated reading and writing heads have to be positioned at very high speeds to high accuracies over data tracks and the vertical positioning of the heads has to be controlled to maintain either a magnetic writing distance or an optical focal distance.

With the more recent advent of microlithographic technology and, more particularly, the development of micro-electromechanical (MEMS) devices, it has also become possible to viably employ electrostatically driven actuation devices. The fact that sufficiently high actuating electrostatic field strengths may be attained using practical voltage levels at the characteristically small inter-electrode distances, lies at the root of this development. More recently magnetically actuated microelectromechanical devices have also been described.

One specialized application field for actuators that has seen much growth in recent times is the digital-on-press developments within the field of lithographic printing. In this field, image data is written directly to a blank lithographic plate using a laser head equipped with modulated laser arrays.

One of the particular challenges in this arena is the need for very precise control of the distance between the focusing lens and the printing plate surface. To establish this control, the focusing lens is affixed to the moving member of an actuator. This moving member is referred to herein as a plunger. Data is written at very high speeds in these systems and the focusing lens has to maintain a precise "flying height" in this process. Because of the large lateral distances traversed in this application compared with typical data storage devices, the actuators have to maintain this accurate separation while the plunger of the actuator traverses over a considerable stroke length to allow the focusing lens to "follow" the variation of the printing plate or medium.

In the most simple incarnation of a linear actuator, a force, either magnetic or electrostatic, is applied to the plunger. The plunger is made subject to a restoring force. In this most simple case, this force is provided by a spring with a simple spring constant. This results in the restoring force being essentially linear in the sense that the force provided by the spring is proportional to the linear displacement of the plunger. It is possible to eliminate the restoring force if a bi-directional actuator, such as a voice-coil, is used.

The actuating force, on the other hand, being magnetic or electrostatic in nature, is inherently non-linear. In particular, it is known to those skilled in the art of magnetic actuators in particular, that, in principle, the net force on the plunger in a magnetic actuator is related to the square of the magnetizing current and inversely related to the square of the magnetic gap (also called the air gap) between the magnetic member of the plunger and the fixed driving electromagnet. In practice this relationship is even more complex because, amongst other reasons, saturable magnetic elements are employed to manipulate the behavior of the actuator. The relationship between gap and force also depends upon the geometry of the actuator.

Because of these highly non-linear relationships, a significant problem arises in linearizing the net output force of the moving member of a magnetic actuator in response to an applied force command; i.e., to obtain a plunger force proportional to the input signal in order to establish adequate control over the actuator.

In providing linear force control on the plunger of magnetic actuators, previous control techniques have included flux feedback, force feedback arid current/gap feedback methods. In the case of electrostatic actuators there has been comparatively little described in respect of means to control such actuators beyond simple two-state devices. This dearth of practical analog electrostatic actuator devices is related partly to the nature of the applications that employ them, but also in particular to the difficulty in controlling them in view of the non-linear actuation forces.

In the flux feedback approach used in magnetic devices in particular, the magnetic flux experienced by the plunger is monitored continuously by a sensor, typically a Hall-effect device, and this information is fed back to the control system. Via a wide variety of electronic and computing means, an appropriate compensating current is then applied to the electromagnet driving the device.

One of the drawbacks of this approach for actuators working at high speeds over small stroke lengths is the fact that it is extremely awkward to have a sensor occupying any significant fraction of the magnetic gap (air gap). Recessing the sensor, either into the plunger or into the pole piece of the electromagnet, can cause the sensor to measure a field-strength not entirely representative of the field experienced by the plunger. The relationship between measured field and force on the plunger is therefore perturbed.

The force feedback approach, which is in concept a variation on the flux-feedback technique, incorporates a force sensor in a closed-loop configuration to linearize the net forces on the plunger. The plunger is physically tied to the payload through the force sensor. Any force exerted on the plunger is transmitted through the force sensor to the payload. Force sensors vary, but are typically quartz oscillator crystals, which vary an oscillator frequency in response to a tensile or compressive force. This frequency shift is then used to control the force on the plunger, by adjusting the magnetic flux density produced by the control electromagnet.

Among the drawbacks to this approach is the fact that force sensors capable of a high bandwidth and resolution required for low-level force control are costly, fragile, and require sophisticated support electronics. Further, because of their fragility, these sensors often require elaborate holding fixtures to protect them from damage.

As another approach to force linearization, current/gap feedback has been used. This technique is more common and utilizes the relationship between magnetizing current and air gap for a linear medium in an open force loop configuration. In this method, the force is controlled by employing the fact that the plunger force is nominally proportional to the square of the magnetizing current and inversely proportional to the square of the magnetic gap.

In this approach, any sensor capable of providing a signal proportional to gap position can be used. Previous applications have incorporated eddy current, capacitive, and inductive sensors. By employing both current and gap position sensors, the requirement for and disadvantages of a force sensor are eliminated. To remove the current non-linearity, various bias current techniques have been utilized. However, because of the open force loop configuration and square law relationships, both the position and current sensing signals, as well as squaring compensation circuitry, must be very accurate and linear over all operational conditions. Because of the nominally squared relationship, percentage force errors can be more than twice the percentage position and gap errors that cause them.

It is true in all the aforementioned situations, that the applied plunger force is directly determined by the magnetic field established in the magnetic gap due to the electromagnet coil currents. A linear relationship between the input coil current and plunger movement is therefore ideally required for classic feedback and control systems. The term linear, as used here, means that the differential equations describing the behavior of the actuator are linear. Therefore, non-linearities due to hysteresis and saturation between the magnetic flux and input coil current can seriously impact actuator performance and reduce the applicability/effectiveness of classical control systems algorithms.

The development of high-speed digital control systems has allowed the development of actuator control mechanisms based on pre-calibrated software lookup tables. The typical approach has been to calibrate the current through the electromagnet against displacement of the plunger. This non-linear relationship is then stored as a table of values, and the controller looks up the appropriate electrical current to apply through the electromagnet to balance the restoring force of the spring for the particular degree of displacement of the plunger. This current is applied and the plunger moves to this position of choice.

While this simple one-variable approach is adequate for slow systems, it does not adequately address the problems of high-speed systems where dynamic behavior is very important. These issues may be addressed in part by creating two-dimensional lookup tables that employ both actuator current and the plunger displacement as parameters, these require excessive digital memory and the overall solution becomes more expensive. A method is required that will address the dynamic or "small signal" behavior of high-speed magnetic actuators without making excessive demands on processing power and memory.

In the field of electrostatic devices, actuators have much in common with audio speakers, and the advances in producing audio speakers with superlative frequency characteristics and dynamic range are relevant. However, these devices are limited to comparatively small movements at audio frequencies.

The advent of MEMS devices has made high frequency electromechanical devices possible. However, the microminiaturization makes complex device element arrangements difficult while field-saturable materials are less easy to incorporate and force-feedback is not practicable. There is therefore a particularly great need for a method to linearize the force gradient in electrostatic devices, particularly MEMS devices.

While some of the background gleaned from the discrete magnetic actuator devices is relevant, the existing approaches do not adequately address the unique problems facing the designer of an electrostatic microelectromechanical actuator.

Much attention has been devoted to microelectromechanical devices in various forms. Accelerometers, in particular, share many of the problems related to the design and manufacture of actuators. However, there is one critical aspect in which accelerometers have a significant advantage from which actuators do not benefit namely, the fact that the accelerometers intentionally keep the plunger stationary. Instead they measure the voltage or current required to maintain it in that state when the system into which the accelerometer is incorporated, is accelerated. The plunger therefore does not traverse a significant distance within the electrostatic field in the case of an accelerometer. In the actuator this traverse distance is one of the figures of merit of the device and needs to be as large as possible and as accurately controllable as possible.

It is an objective of the present invention to obtain improved dynamic performance at high displacement speeds and frequencies from an actuator driven with a substantially non-linear force by linearizing the relationship between the actuating impetus and the feedback signal through the separate and concurrent control of dynamic and static characteristics of the actuator.

It is a further objective of the present invention to address the linearization of the relationship between actuating impetus and feedback signal in the particular case of actuators where space is at a premium and additional feedback sensors are difficult to accommodate.

It is yet a further objective of the present invention to address the linearization of the relationship between actuating impetus and feedback signal in a microelectromechanical actuator where additional feedback sensors are particularly difficult to implement and the non-linearity in the actuating force has particularly detrimental consequences.

BRIEF SUMMARY OF THE INVENTION

In accordance with the present invention, the control over a high-speed non-linear actuator is improved by linearizing the relationship between the actuating impetus and the feedback control signal via a method that employs the separate and concurrent control of the static and dynamic characteristics of the device without resorting to the use of force-feedback or field-strength feedback. The resonant frequency of the plunger of the actuator is manipulated during operation such as to maintain it at a substantially fixed optimal value. The method is particularly advantageous in devices where space is at a premium and force-feedback or field-strength feedback mechanisms are difficult to implement.

DETAILED DESCRIPTION OF THE PREFERRED EMBODIMENT

Figure 1:
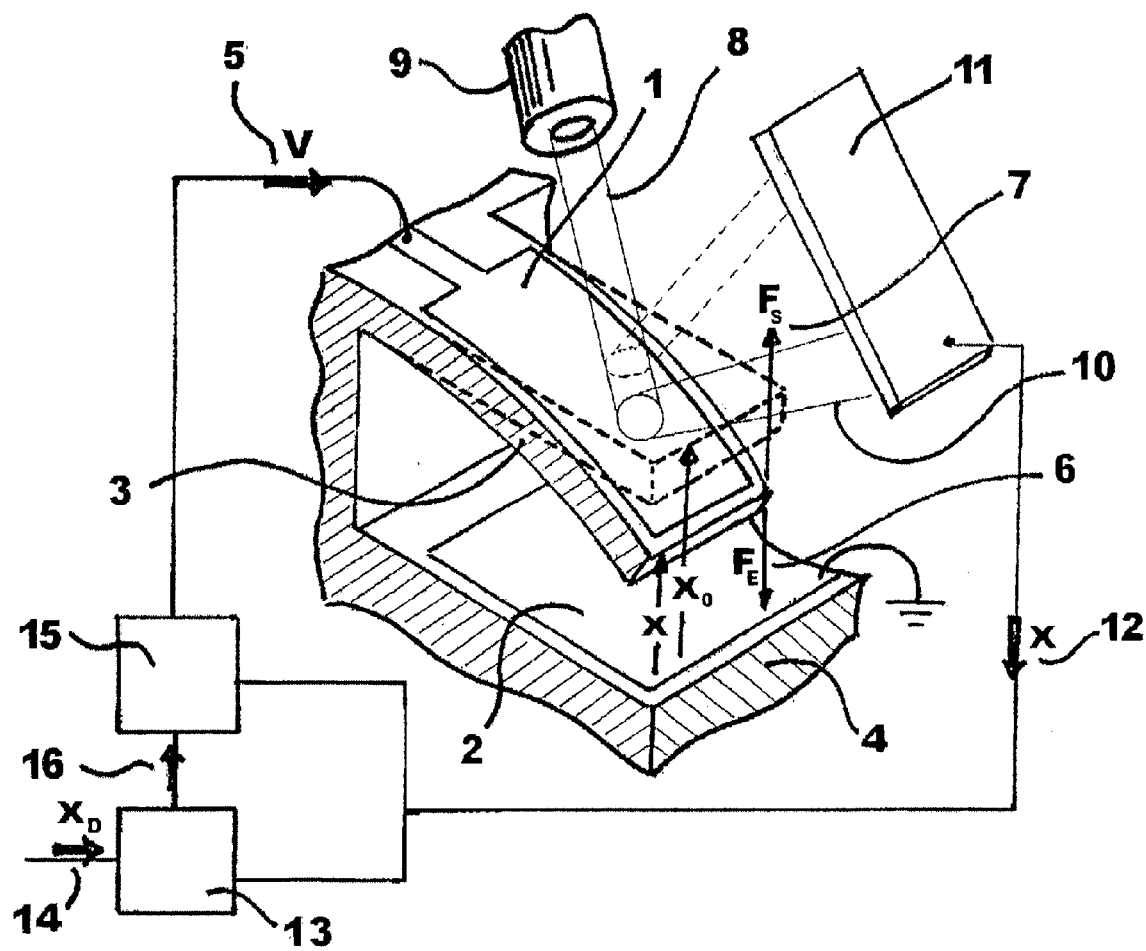
FIG. 1 schematically shows a microelectromechanical actuator and its control system as per the preferred embodiment of the present invention.

The present invention will be described with reference to a schematic diagram of a generic electrostatic microelectromechanical (MEMS) actuator and its control system as given in FIG. 1, representing the preferred embodiment of the invention. With reference then to FIG. 1, a cantilever electrode 1 and a second electrode 2 are fashioned on the cantilever 3 and base 4 of the MEMS device respectively. The actuating impetus 5 is in the form of voltage V, which is applied between these two electrodes and which causes the two electrodes to exhibit mutual electrostatic attraction. In this preferred embodiment, cantilever 3 represents the generic plunger and the electrostatic attractive force 6 represents the generic actuating force in the actuator device. Due to the fact that cantilever 3 is extremely thin, it can elastically deflect downwards towards the attractive second electrode 2. The range over which such a device deflects is referred to herein as the actuation range. In this preferred embodiment the vertical component of the elastic force on the cantilever 3 represents the generic restoring force 7. Since the actual angular deflections in MEMS devices are relatively small, this force may be taken as substantially linear with the deflection at the free edge of the cantilever 3.

Light beam 8 from laser device 9 is reflected off the surface of cantilever 3 as reflected beam 10. To this end the reflection may be executed either from the electrode itself or from an additional layer or combination of layers fashioned on the upper surface of the cantilever 3 for this very purpose. Reflected beam 10 will be deflected commensurate with the deflection of cantilever 3. This beam deflection may be sensed by a sensor 11 which may be an array sensor. Alternatively the sensor 11 may measure the divergence of the reflected beam 10. Both measurement implementations provide a cantilever deflection signal 12 and sensor 11 represents the generic displacement sensor of the present invention and the signal 12 produced by and labeled "x" represents the generic displacement signal of this present invention.

The displacement signal 12 produced by displacement sensor 11 is sent to actuator control unit 13. Actuator control unit 13 receives displacement request signal 14 (denoted by $x_D$) from the rest of the system (not shown here) of which the actuator depicted here forms part. Actuator control unit 13 determines, by standard control systems means that are well known to practitioners of the art, a desired actuating signal 16 and provides this signal to feedback control unit 15 which in turn determines the impetus to be applied, shown in FIG. 1 as actuating impetus 5. This signal is applied as to the actuator as voltage V.

Displacement signal 12 is also provided to feedback control unit 15, which determines the actuating impetus 5 by a method to be described below using as inputs displacement signal 12 and desired actuating signal 16.

In prior art actuator systems the use of force-feedback or field-strength feedback (of which flux-feedback in magnetic actuators is a specific example) inherently establishes a direct linear relationship between the feedback signal and the force to be applied. However, in systems limited to measuring the displacement, due to space restrictions or other reasons, the relationship between feedback signal and actuating impetus is non-linear.

The present invention represents a method to obtain a linear relationship between actuating impetus and displacement signal in actuator systems by controlling separately and concurrently the static and dynamic behaviors of the actuator. This method is based on the following characteristics of a generic microelectromechanical actuator:

The electrostatic force exerted by the voltage V applied between electrodes 1 and 2, we denote by $F_E$. This is the actuating force 6 of the actuator and is given by:

$$F_E = -k_E (x/V)^{-2} \tag{1}$$

where $k_E$ is substantially a constant for the geometry of the device. In this application for letters patent we refer to this constant as the electrostatic force constant. The varying position of the deflected cantilever 3 is denoted by x and is measured upwards from second electrode 2. Voltage V is the applied voltage between electrodes 1 and 2. The rest position of the cantilever 3 in the absence of an applied voltage is denoted by $x_0$.

By approximation to a simple spring, the restoring force 7 acting on the cantilever 3 is given by $$F_S = k_0 (x_0 - x) \tag{2}$$

Where $k_0$ is the effective spring constant of the cantilever 3 and may be obtained from elastic modeling of the cantilever 3 or by direct measurement.

At a given applied voltage V, the cantilever will come to rest at a position x that may be found by solving the force balancing relationship given by equation 3

$$F_S + F_E = 0 \tag{3}$$

This leads to multiple non-imaginary solutions, but the only dynamically stable solution is one where small changes in x are subject to a restoring force; that is, if x decreases the force in the positive x-direction increases. This means the actuator is dynamically stable if, at a constant applied voltage, we have $$(\partial/\partial x)(F_S - F_E) < 0 \tag{4}$$

Solving equation (3) under the constraints of equation (4) provides plunger displacement x as a function f of the applied voltage V:

$$x = f(V) \tag{5}$$

and $$V = f^{-1}(x) \tag{6}$$

The relationships given by equations (1) to (6), and embodied in function f, adequately describe the static behavior of the device where a voltage V is applied and the cantilever ultimately comes to rest at a displacement x. These equations may therefore be employed to design an actuator that is required to work at low frequency or speed where the dynamic behavior may largely be ignored or designed around.

The same is not true for actuators where speed is at a premium and rapidly varying signals need to be responded to. In such situations, the dynamic behavior of the cantilever 3 must be considered. The actuating impetus 5 has to be modified "on the fly" to manage the actuator to its desired displacement $X_D$ as requested via displacement request signal 14. This is particularly important in the case of MEMS devices where the well-known phenomenon of "snap-down" occurs when the cantilever 3 overshoots a certain displacement. This phenomenon occurs due to the fact that the non-linearly increasing electrostatic actuating force 6, given by $F_E$, totally overwhelms the restoring force 7, given by $F_S$ for small decreases in x. The result is that the cantilever 3 snaps down to its fullest extent onto the base of the device. The set of equations (1) to (6) therefore does not provide an adequate basis of approach for practical MEMS devices under these "snap-down" conditions.

To make an actuator to operate at high displacement rates, cognizance must be taken of the resonant frequency of the plunger, which, at a given displacement x is given by an equation of the form:

$$w = [k_S/m]^{1/2} \tag{7}$$

where m is the mass of the generic plunger, represented in the preferred embodiment by cantilever 3 and where $k_S$ is the instantaneous equivalent spring constant, not to be confused with the effective spring constant $k_0$. We employ here the concept of instantaneous equivalent spring constant to describe the oscillatory behavior of the cantilever 3 for small amplitudes of vibration at a generalized displacement x under the action of an applied actuating force 6. When there is no actuating force applied and the plunger is in its rest position, this frequency is denoted by $w_0$, which we refer to herein as the natural mechanical resonant frequency. The resonant frequency of the plunger at a general displacement under the influence of the actuating force, will be referred to herein as the forced resonant frequency.

Given the fact that there is an actuating force 6 operating on the cantilever 3, both $k_S$ and the forced resonant frequency w of cantilever 3 will vary with displacement x because the derivative of the actuating force 6 with respect to x, $\partial F_E/\partial x$, varies with displacement x. The instantaneous equivalent spring constant at a general displacement x is given by $$k_S = -(\partial/\partial x)(F_S + F_E) \quad (8)$$

$$= k_0 - 2k_E V^2 x^{-3} \quad (9)$$

When the applied voltage V (the actuating impetus 5 of this preferred embodiment) is zero, $k_S$ is simply the effective spring constant $k_0$. As the voltage V is increased, $k_S$ decreases by equation (9) and, by virtue of equation (7), the forced resonant frequency of the cantilever 3 decreases and this inherently reduces the performance and control of the device at increasing displacements.

It is to be noted that for $(\partial/\partial x)(F_S - F_E) > 0$ the electrostatic actuating force 6 is dominating and the device goes into the "snap-down" condition. For $(\partial/\partial x)(F_S - F_E) = 0$ the forced resonant frequency is infinitesimally small and the device becomes essentially uncontrollable due to insufficient restoring force 7, this condition pertaining when the device is on the verge of the "snap-down" condition. For regular controlled operation in the non-snap-down region, equations (4) and (8) dictate that the following condition should therefore be maintained:

$$k_S > 0 \quad (10)$$

In order to describe the dynamic behavior of the device, speed or momentum and acceleration need to be factored in. This, however, also advantageously provides a means to linearize the device. In the preferred embodiment of the present invention, the slope of the displacement with respect to applied voltage is dynamically kept constant over the actuation range by manipulating, at appropriately high speed, the only controllable variable at our disposal, namely the applied voltage itself. With reference to equation (8), this produces an instantaneous equivalent spring constant that is substantially constant over the actuation range. Along with it there results, by virtue of equation (7), a forced resonant frequency that is substantially constant over the same range. The instantaneous slope of the applied voltage with respect to the displacement of the plunger is referred to herein as the actuation gradient and the resonant frequency that is imposed on the actuator by this approach, is referred to herein as the imposed resonant frequency.

Based on the above analysis and concept, the method of the present invention is implemented as follows:

Firstly, the slope of the displacement x with respect to applied voltage V is intentionally maintained at a some chosen constant value $m_D$ different from zero by dynamically manipulating the applied voltage V; that is:

$$\partial x/\partial V = m_D \quad (11)$$

The control algorithm may now be summarized as follows for a situation that stays within the non-snap-down condition of equation (10):

The input to the overall actuating system is the desired displacement $x_D$ in the form of signal 14 in FIG. 1. This signal is applied to actuator control unit 13. By conventional control systems methodology, well known to practitioners in this field, actuator control unit 13 converts this input to a desired actuating signal 16. Functionally this signal represents a desired force and we denote it by $F_D$. This signal is input to feedback control unit 15.

Within feedback control unit 15, linear spring equation (2) is employed to obtain a force-equivalent displacement, which we denote by $x_S$. Lookup table $V = f^{-1}(x)$ of equation (6) is used to determine desired applied voltage $V_S$. The instantaneous value of the actual displacement x is measured using sensor 11, and the desired voltage $V_D$ is determined via the known pre-calibrated constant slope $$m_D = (x_D - x_S)/(V_D - V_S)$$

so that $$V_D = (x_D - x_S)/m_D + V_S \quad (13)$$

If the input $F_D$ changes, a new voltage $V_D$ is determined as above. If the position changes, the voltage changes as per equation (13). The actuator control unit 13 is not burdened with this process and merely supplies the value of $F_D$.

The complete algorithm, for a cantilever range that does not include snap-down, comprises the following steps:
Firstly the actuator is characterized as follows:

Step 1: Apply voltage $V_S$ in discrete steps over the entire range, allow the actuator position to settle, and record the resultant displacement $x_S$ for each voltage.

Step 2: Using this result, together with suitable interpolation, generate a lookup table to get $X_S = f(V_S)$ and its inverse $V_S = f^{-1}(x_S)$. This lookup table set represents the static behavior of the actuator.

Step 3: Measure the natural mechanical resonant frequency $w_0$ at $V_S = 0$ as follows: Give a small pulse in voltage $V_S$ and return $V_S$ to zero and record the cantilever displacement x. Analyze the displacement x versus time to get the natural mechanical resonant frequency.

Step 4: Implement the control algorithm described below at one value of $x_S$, using a trial value of $\partial x/\partial V = m$. The plunger (cantilever in the case of the MEMS) is given an impetus via applied voltage or otherwise, and the forced resonant frequency is determined, the actuator being under the dynamic control of the algorithm in which the voltage is manipulated to maintain the selected value of m. The value of m is adapted until the forced resonant frequency equals the natural mechanical resonant frequency $w_0$. Repeat this process for all selected values of $x_S$ as constitute the non-snap-down actuation range.

It is to be noted that, by intentionally restricting the actuation range to exclude the rest position and positions in proximity to it, a value of m may be selected and imposed on the system in such a way that the imposed resonant frequency is in fact greater than $w_0$, This reduced actuation range is referred to herein as the fractional actuation range.

In the general case this fractional actuation range can equate the full actuation range at which point the imposed resonant frequency that may be maintained will, be $w_0$.

Step 5: Create from the data so obtained an interpolatable lookup table $m_S=g(x_S)$ allowing the generation of a value for slope $m_S$ for any given value of $x_S$ such that the forced resonant frequency remains $w_0$. If an alternative value of resonant frequency is preferred to be imposed on the actuator as imposed resonant frequency, then step 4 is performed for that frequency.

The force control algorithm for a fully characterized actuator is performed as follows:

Step a: Input desired displacement value $x_D$ into actuator control unit 13

Step b: Actuator control unit 13 determines force value $F_D$

Step c: Using equation (2), translate $F_D$ into $x_S$

Step d: Using the $V_S=f^{-1}(x_S)$ lookup table, generate $V_S$

Step e: Using the $m_S=g(x_S)$ lookup table, generate $m_S$

Step f: Measure the position x

Step g: Since $m_S$, $x_S$, $V_S$ and x are known, calculate V from:

$$m_S=(x_S-x)/(_S-V) \quad (14)$$

Step h: Apply voltage V between electrodes 1 and 2.

Steps f to h are repeated for every calculation cycle

Step i: Repeat steps c to h whenever a new value of $F_D$ is received.

The actuator control unit 13 can now implement a classic $F=A_1\partial^2 x/\partial t^2+A_2\partial x/\partial tv+A_3 x$ linear type of control system, where $A_1$, $A_2$ and $A_3$ are constants with respect to time t and where x is the displacement of the plunger, without being burdened with having to resolve the non-linearities that arise from the voltage control.

In the case of magnetic actuators the situation may be approached exactly in parallel, since the actuating force produced by a current I through the coils of the electromagnet of the actuator is given by $$F_M=-k_M(x/l)^{-2} \quad (15)$$

where $k_M$ is substantially a constant for the geometry of the device. The parallel with equation (1), representing the electrostatic case, is evident. In this magnetic implementation of the present invention, the applied current through the electromagnet coil plays the same role as the applied voltage does in the electrostatic case.

In practical magnetic actuators, magnetically saturable materials are often introduced in order to prevent as far as possible the actuator from going into the magnetic equivalent snap-down state when the actuating magnetically induced force exceeds the restoring elastic force. It can be shown mathematically that the above implementation applies in exactly the same way with different values of x and m and with l, the current, being the actuating impetus. In this case the instantaneous slope of current with respect to displacement is the actuation gradient. Since these values are determined iteratively as part of the invention, the method described above applies in all respects.

In the case of an actuator exhibiting snap-down, the algorithm is implemented as follows. We describe the method at the hand of the electrostatic MEMS actuator, but as described above, the entire principle holds also for magnetic devices exhibiting snap-down with applied electromagnet current replacing the voltage as actuating impetus and with all constants commensurately amended.

Over some range of voltage V, the actuator is stable (i.e. does not snap down) with the impetus held constant. The previous Steps 1–6 are followed over that range. Implement the algorithm for force control over the whole range, leaving the values of the lookup table empty for $x_D$ that represent displacements in the snap-down range. To characterize the actuator in this latter dynamically unstable region, the following steps pertain:

Step 1: Move to a dynamically stable position closest to the unstable snap-down position and activate the force control algorithm.

Step 2: Choose a position where the device just enters the snap-down regime: in the $V=f^{-1}(x)$ lookup table, replace the corresponding empty memory location with a best estimate trial values of $x_S$ and $V_S$. In the $m=g(x)$ lookup table, insert in the corresponding memory location the value of m from the nearest dynamically stable position x.

Step 3: With the force control algorithm active, slowly move the actuator to this new $x_S$. If the step was small enough, the servo should settle at an actual value of x and V (since m will not change much over a small range). These actual values of x and V will replace the trial solutions in step 2.

Step 4: Move back to a dynamically stable position, and insert the actual values of x and V in the $V=f^{-1}(x)$ lookup table.

Step 5: Move to the new (x,V) position and disturb the actuator slightly to measure the forced resonant frequency with the force control algorithm active. Modify the value of m in the $m=g(x)$ lookup table until the natural mechanical resonant frequency is obtained.

Step 6: Repeat steps 2–5, each time choosing a displacement x deeper into the snap-down range, until the look-up tables have been filled with actual values.

This completes the characterization for the actuator exhibiting snap-down. The force control algorithm is the same as described for the non-snap-down case above.

It is to be noted that, while the execution of this method by means of software or firmware comprises sequential actions with respect to the two sets of lookup tables, these actions are performed every time the actuation cycle is undertaken. The term concurrent is used herein to describe this temporal arrangement of the actions. In this preferred embodiment of the present invention the dynamic and static control actions are therefore performed concurrently, but separately, with respect to dynamic behavior on the one hand and static behavior on the other.

It will be clear to those skilled in the art of actuators, that, in a more general case, it is possible to impose an imposed frequency that is not kept constant with the displacement of the plunger. This approach may be implemented in the same basic manner as the method detailed here, except that different values of imposed frequency are selected for different plunger displacements. The forced resonant frequency of the plunger will therefore vary with plunger displacement in a pre-determined and designable fashion.

There has thus been outlined the more important features of the invention in order that it may be better understood, and in order that the present contribution to the art may be better appreciated. Those skilled in the art will appreciate that the conception on which this disclosure is based may readily be utilized as a basis for the design of other apparatus for carrying out the several purposes of the invention. It is most important, therefore, that this disclosure be regarded as including such equivalent apparatus as do not depart from the spirit and scope of the invention.

What is claimed is:

1. A method for controlling a position of a plunger of an actuator within an actuation range, said actuation range including at least a portion of a snap-down region of said actuator, said method comprising manipulating a forced resonant frequency of said plunger of said actuator, such that said plunger is prevented from entering a snap-down condition.

2. A method according to claim 1, wherein manipulating said forced resonant frequency comprises maintaining said forced resonant frequency at a substantially constant value over a fractional actuation range of said plunger.

3. A method according to claim 2, wherein maintaining said forced resonant frequency comprises maintaining said forced resonant frequency at a maximum maintainable value over said fractional actuation range.

4. A method according to claim 1, wherein manipulating said forced resonant frequency comprises maintaining said forced resonant frequency substantially at a value of a natural mechanical resonant frequency of said plunger, said forced resonant frequency being maintained at the value of said natural mechanical resonant frequency over said actuation range.

5. A method for controlling a position of a plunger of an actuator over an actuation range including at least a portion of a snap-down region of said actuator, said method comprising:
   a. employing an actuating impetus that is non-linear with displacement;
   b. using displacement as the only measured feedback signal; and,
   c. keeping forced resonant frequency of said plunger of said actuator substantially constant under actuation,
whereby said plunger is prevented from entering a snap-down condition.

6. A method as in claim 5, wherein said actuating impetus is controlled by a software control algorithm.

7. A method as in claim 5, wherein said forced resonant frequency is kept substantially at a constant value over a fractional actuation range, said constant value being substantially equal to a maximum attainable oscillation frequency of said plunger under actuation over said fractional range.

8. A method as in claim 5, wherein said forced resonant frequency is maintained substantially equal to the natural mechanical resonant frequency of said plunger.

9. A method as in claim 6 comprising imposing a constant actuation gradient on said actuator as long as a desired actuating signal to said actuator is constant.

10. A method as in claim 9, wherein the forced resonant frequency is substantially equal to a maximum attainable oscillation frequency of said plunger under actuation over a fractional actuation range.

11. A method as in claim 9 wherein said forced resonant frequency is substantially equal to a natural resonant frequency of said plunger.

12. A method for controlling an actuator over an actuation range, said method comprising
   actuating the plunger of said actuator using one of electromagnetic and electrostatic force to provide an actuating force;
   measuring a plunger displacement as a feedback signal;
   obtaining a first calibration relationship of plunger displacement as a function of activating impetus;
   obtaining a second calibration relationship of an actuation gradient as a function of the plunger displacement, said actuation gradient being chosen to impose a constant forced resonant frequency on said plunger at each displacement; and,
   keeping said forced resonant frequency of said plunger substantially constant over said actuation range.

13. A method as in claim 12 wherein at least one of said first calibration relationship and said second calibration relationship comprises a one-dimensional look-up table.

14. A method as in any of claims 1 to 11 or 12 wherein said actuator is a microelectromechanical actuator.

15. A method as in claim 12, wherein said fractional actuation range includes at least a portion of a snap-down region of said actuator.

16. A method as in claim 14, wherein said fractional actuation range includes at least a portion of a snap-down region of said actuator.

17. A method as in claim 5 wherein the plunger comprises a cantilever and controlling the actuator comprises deflecting the cantilever.

18. A method as in claim 17 wherein the cantilever comprises a micromachined cantilever and deflecting the cantilever comprises applying an electrostatic potential between the cantilever and an electrode.

19. A method as in claim 5 wherein controlling the actuator comprises separately and concurrently controlling a displacement of the plunger and a slope of the actuating impetus with respect to the displacement of the plunger.

20. A method of controlling a position of a plunger of an actuator,
   wherein the plunger is subject to a linear restoring force acting to bias the plunger toward a rest position and a nonlinear actuating force acting to move the plunger away from the rest position, and the plunger is movable over an actuation range including at least a portion of a snap-down region of the actuator,
   wherein, when the plunger is at an equilibrium position in the snap-down region, for a time invariant actuating force, a small displacement of the plunger away from the equilibrium position causes an increase in the actuating force greater than a corresponding increase in the restoring force,
   and the method comprises:
      monitoring a position of the plunger;
      supplying the position of the plunger as input to a control algorithm;
      dynamically varying the actuating force based on an output of the control algorithm;
   wherein the dynamically varying actuating force causes a forced resonant frequency of the plunger to be such that the plunger is prevented from entering a snap-down condition.

21. A method as in claim 20 wherein monitoring a position of the plunger comprises:
   measuring a plunger displacement from the rest position as a feedback signal; and the method comprises:
      obtaining a first calibration relationship of plunger displacement as a function of the actuating force; and,
      obtaining a second calibration relationship of an actuation gradient as a function of plunger displacement, the actuation gradient being chosen to impose a constant forced resonant frequency on the plunger at each displacement.

* * * * *